US007060383B2

(12) United States Patent
Yoshimoto et al.

(10) Patent No.: US 7,060,383 B2
(45) Date of Patent: Jun. 13, 2006

(54) FUEL CELL

(75) Inventors: Yasunori Yoshimoto, Ashikaga (JP); Hirokazu Izaki, Ashikaga (JP); Akira Hamada, Ashikaga (JP); Yugo Fukami, Gunma (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 10/975,430

(22) Filed: Oct. 29, 2004

(65) Prior Publication Data

US 2005/0095493 A1 May 5, 2005

(30) Foreign Application Priority Data

Oct. 29, 2003 (JP) ............................ 2003-369518

(51) Int. Cl.
*H01M 8/02* (2006.01)
*H01M 8/10* (2006.01)

(52) U.S. Cl. ............................ 429/39; 429/30; 429/34; 429/38

(58) Field of Classification Search .................. 429/34, 429/39
See application file for complete search history.

(56) References Cited

U.S. PATENT DOCUMENTS

| | | | | |
|---|---|---|---|---|
| 6,761,990 | B1 * | 7/2004 | Yoshitake et al. | 429/34 |
| 2002/0064702 | A1 * | 5/2002 | Gibb | 429/34 |
| 2002/0127457 | A1 * | 9/2002 | Trapp et al. | 429/34 |
| 2004/0146771 | A1 * | 7/2004 | Saito et al. | 429/34 |

FOREIGN PATENT DOCUMENTS

JP 2001-057219 2/2001

* cited by examiner

*Primary Examiner*—John S. Maples
(74) *Attorney, Agent, or Firm*—McDermott Will & Emery LLP

(57) ABSTRACT

In a fuel cell provided with a pair of separators sandwiching a cell that includes an electrolyte and a fuel electrode and an air electrode provided on respective sides of the electrolyte, gas passages in a separator adjacent to the fuel electrode are opposite to flat surfaces of a separator adjacent to the air electrode. Also, gas passages in the separator adjacent to the air electrode are opposite to flat surfaces of the separator adjacent to the fuel electrode.

4 Claims, 10 Drawing Sheets

100

PRIOR ART

FUEL CELL

BACKGROUND OF THE INVENTION

1. Field of the Invention

The present invention relates to a fuel cell.

2. Description of the Related Art

In recent years, attention is paid to fuel cells characterized by high energy conversion efficiency and not producing hazardous materials as a result of generating electricity. A polymer electrolyte fuel cell operating at a temperature of 100° C. or lower is known as one type of such fuel cells.

A polymer electrolyte fuel cell is a power generating device that is a membrane electrode assembly (MEA) in its basic structure in which a solid polymer electrolyte membrane is sandwiched between a fuel electrode and an air electrode. A fuel gas including hydrogen is supplied to the fuel electrode and an oxidization gas including oxygen is supplied to the air electrode. Electricity is generated according to the following electrochemical reaction.

$$\text{Fuel electrode: } H_2 \rightarrow 2H^+ + 2e^- \quad (1)$$

$$\text{Air electrode: } \tfrac{1}{2}O_2 + 2H^+ + 2e^- \rightarrow H_2O \quad (2)$$

At the fuel electrode, hydrogen included in the supplied fuel is split into hydrogen ions and electrons according to the formula (1) shown above. Hydrogen ions move toward the air electrode via the interior of the solid polymer electrolyte membrane. Electrons move toward the air electrode via an external circuit. At the air electrode, oxygen included in the oxidizing gas supplied to the air electrode reacts with hydrogen ions and electrons arriving from the fuel electrode, so as to produce water according to the above formula (2). As a result of electrons moving from the fuel electrode to the air electrode in the external circuit, electric power is extracted.

Separators are provided outside the fuel electrode and the air electrode. The separator outside the fuel electrode is provided with a fuel gas passage so that the fuel gas is supplied to the fuel electrode. Similarly, the separator outside the air electrode is provided with an oxidizing gas passage so that the oxidizing gas is supplied to the air electrode. A passage for cooling water for cooling the electrodes is provided between the separators.

Requirements to be fulfilled in order for a fuel cell to be commonly used at homes are small size, light weight and stable output characteristics. For this reason, studies have been made on a fuel cell stack in which fuel cells are stacked via separators (patent document No. 1). The patent document No. 1 describes an approach to improve the characteristics of fuel cell by a specific placement of passages on the plane of a separator. However, the related-art fuel cell stack has room for improvement in respect of a stable output.

Related Art List

Patent document No. 1 Japanese Laid-Open Application No. 2001-57219

SUMMARY OF THE INVENTION

The present invention has been done in view of the aforementioned circumstances and its objective is to provide a technology to stabilize the output of fuel cell.

The inventors have made a study focused on the stabilization of the output of fuel cell. Our study has found that the area of cross section of a passage formed on the surface of a separator of a fuel cell, the cross section being perpendicular to the length of the passage, varies from passage to passage due to the fact that an MEA intrudes in the direction of depth of the passage. A description will be given of this phenomenon by referring to FIGS. 9–11.

FIGS. 9–11 are schematic sections showing how an MEA is sandwiched by two separators. Referring to FIG. 9, pressure is applied to an MEA 60 from a first separator 62 and a second separator 64. An area in the first separator 62 in which a passage 66 is formed is relieved of any pressure. For this reason, no pressure is applied from above to the area of the MEA 60 opposite to where the passage 66 is formed. The MAE 60 lies off toward the top of the figure, thus creating an intrusion 68 in the passage 66. When the size of the intrusion 68 varies between the passages 66, the area of cross section of the passage 66 varies from passage to passage. As the area of cross section of the intrusion 68 is increased, the valid area of cross section of the passage 66 for supply of a reactant gas is reduced. Accordingly, a passage resistance is increased. As a result, the reactant gas is prevented from flowing smoothly so that a stable supply of the reactant gas becomes difficult.

The patent document No. 1 describes a related-art fuel cell in which, as shown in FIG. 8, passages are formed at equal intervals in each of the two separators provided on respective sides of a single cell such that the passages are opposite to each other (patent document No. 1, FIG. 8). However, as a result of the inventors' study, it was found that the intrusion of an electrode is significant and a variation in the area of cross section is likely to occur, when the passages on the two separators are at equal intervals from each other and the passages are opposite to each other.

One alternative approach to supply a fuel gas and air at a predetermined flow rate is to provide unequal intervals between passages on the two separators. When the interval between passages for the fuel electrode and that of the air electrode differ, a problem occurs according to a normal design of fuel cell. A passage formed in one of the separators may be opposite to a passage in the other separator, as shown in FIG. 10, or opposite to an area outside the passage in the other separator, as shown in FIG. 9, or opposite to a part of a passage in the other separator, as shown in FIG. 11. Therefore, the pressure applied to the electrode covering the passage is likely to vary, causing a variation in the degree of intrusion of the electrode. Thus, the area of cross section is subject to variation.

As a result of the inventors' study, it was also found that, when the area of cross section of passages provided in a separator varies from passage to passage, it is impossible to uniformly supply a fuel gas or air to the entirety of the surface of an MEA, preventing stabilization of the output of fuel cell. Accordingly, the inventors have made a study in order to prevent variation in the area of cross section of passages and have arrived at the present invention.

The present invention provides a fuel cell comprising: a membrane electrode assembly including an electrolyte and a pair of electrodes provided on respective sides of the electrolyte; and a first separator and a second separator sandwiching the membrane electrode assembly, wherein the first separator is provided with a first passages comprising a plurality of recesses formed on a first separator surface in contact with the membrane electrode assembly, the second separator is provided with a second passage comprising a plurality of recesses formed on a second separator surface in contact with the membrane electrode assembly, the recesses of the first separator are opposite, across the membrane electrode assembly, to the second separator surface in contact with the membrane electrode assembly, and the recesses of the second separator are opposite, across the membrane electrode assembly, to the first separator surface in contact with the membrane electrode assembly.

Since the recesses provided in the first separator and the recesses provided in the second separator are not opposite to each other, variation in the degree of intrusion of the membrane electrode assembly into the recesses is prevented. Accordingly, variation in the flow rate of fluid moving in the first passage and the second passage is prevented. Consequently, the fuel cell can be operated in a stably manner.

In the fuel cell according to the present invention, the plurality of recesses constituting the first passage and the plurality of recesses constituting the second passage may extend in one direction and parallel with each other. In the fuel cell according to the present invention, first separator and the second separator may include a straight passage comprising a plurality of recesses parallel with each other.

When the passage of the separator is straight, the quantity of gas supplied to the recesses tends to vary from recess to recess due to a variation in the area of cross section of the recesses caused by intrusion of the electrode. When corner portions are provided in the passage as in the fuel cell of the patent document No. 1, the intrusion of the membrane electrode assembly contributes relatively less significantly to variation in the area of cross section of the recesses because the corner portions and the straight area are different in the area of cross section. In the case of straight passage that extends in one direction, variation in the area of cross section of the recesses due to the intrusion of the membrane electrode assembly affects the quantity of supply of fluid moving in the passage more significantly.

By providing a recess constituting the passage of a given separator so as to be opposite to the flat surface of the other separator outside the passage, variation in the area of cross section of the recesses is properly prevented even when the passage is straight. Accordingly, the fluid can be uniformly supplied to the entirety of the membrane electrode assembly. Consequently, the output of the fuel cell can be stabilized.

In the fuel cell according to the present invention, the plurality of recesses constituting the first passage and the plurality of recesses constituting the second passage may have substantially the same cross-sectional configuration and be formed at regular intervals.

The intervals between the recesses constituting the first passage and the intervals between the recesses constituting the second passage may be different. With this arrangement, a desired quantity of fluid can be supplied to the electrodes respectively facing the first separator and the second separator. Accordingly, the output characteristics of the fuel cell can be improved further.

The depth of the recesses constituting the first passage may be greater than the width of the recesses constituting the first passage. With this arrangement, the degree of intrusion of the electrode in the direction of depth of the first passage is reduced. Accordingly, reduction in the area of cross section of the passage due to the intrusion of the electrode is prevented. Consequently, the output of the fuel cell is further stabilized.

Optional combinations of the aforementioned constituting elements, and implementations of the invention in the form of methods and apparatuses may also be practiced as alternative modes of the present invention.

DETAILED DESCRIPTION OF THE INVENTION

A description will now be given of the embodiment of the present invention by referring to the attached drawings. A description will now be given of a polymer electrolyte fuel cell according to the embodiment. The fuel gas and the oxidizing gas are generically referred to as reactant gases in this specification.

Figure 1:
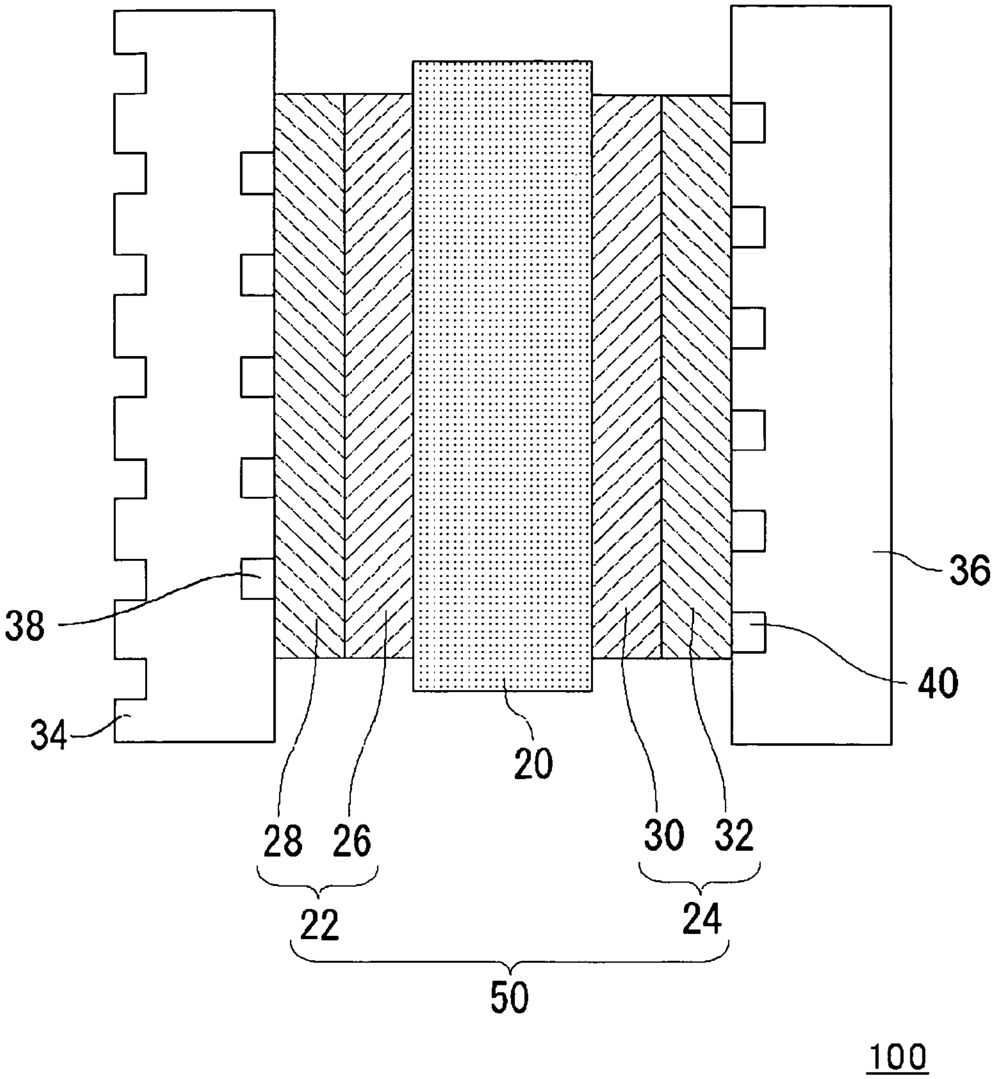
FIG. 1 is a schematic section showing a structure of a fuel cell according to an embodiment of the present invention.
Figure 9:
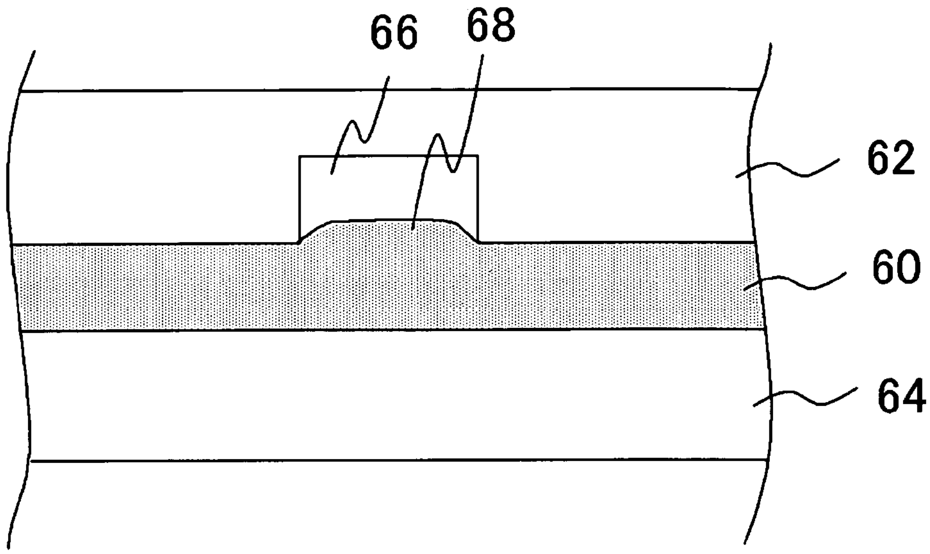
FIG. 9 is a schematic section showing how two separators sandwich an MEA.
Figure 10:
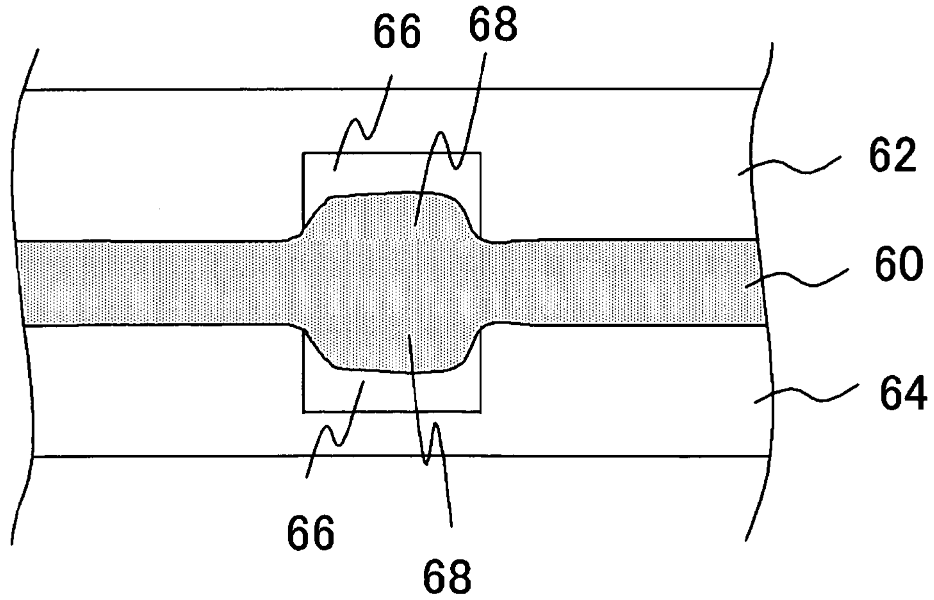
FIG. 10 is a schematic section showing how two separators sandwich an MEA according to another arrangement.
Figure 11:
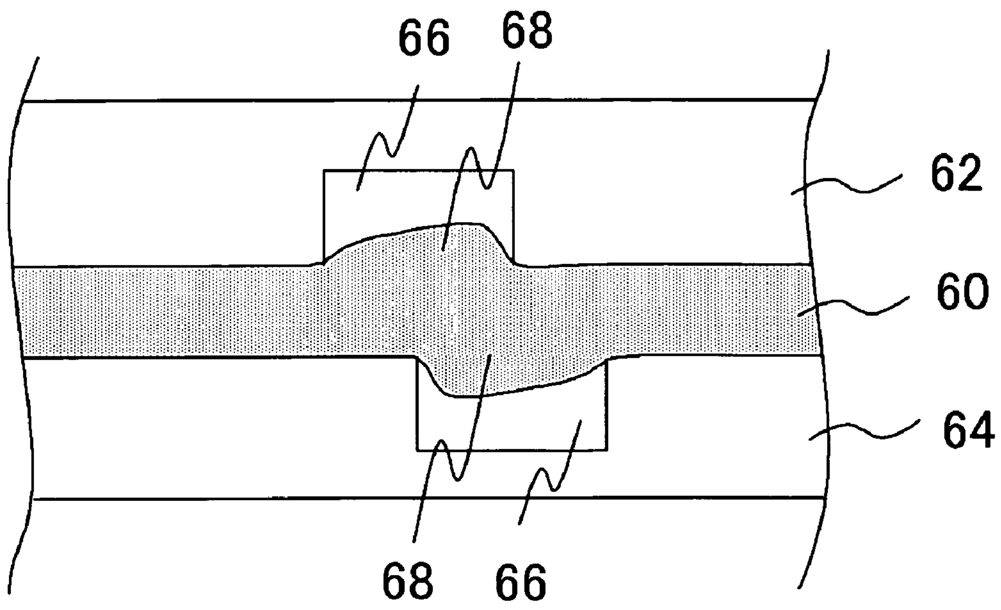
FIG. 11 is a schematic section showing how two separators sandwich an MEA according to still another arrangement.

FIG. 1 schematically shows a cross section of a fuel cell 100 according to the embodiment of the present invention. The fuel cell 100 is provided with a sheet cell 50, and a separator 34 and a separator 36 are provided on respective sides of the cell 50. In this example, only one cell 50 is shown. Alternatively, a laminate of a plurality of cells 50 each sandwiched by the separator 34 and the separator 36 may construct the fuel cell 100. The cell 50 has a solid polymer electrolyte membrane 20, a fuel electrode 22 and an air electrode 24. The cell 50 corresponds to the MEA 60 of FIG. 9. The fuel electrode 22 and the air electrode 24 may be referred to as gas diffusion electrodes. The fuel electrode 22 has a laminate of a catalytic layer 26 and a gas diffusion layer 28, and the air electrode 24 similarly has a laminate of a catalytic layer 30 and a gas diffusion layer 32. The catalytic layer 26 of the fuel electrode 22 and the catalytic layer 30 of the air electrode 24 are provided opposite to each other, sandwiching the solid polymer electrolyte membrane 20.

Fuel electrode gas passages 38 are provided in on one of the surfaces of the separator 34 facing the fuel electrode 22. A fuel gas is supplied to the cell 50 via the fuel electrode gas passages 38. Similarly, air electrode gas passages 40 are provided in the separator 36 provided adjacent to the air electrode 24. An oxidizing gas is supplied to the cell 50 via the air electrode gas passages 40. More specifically, when the fuel cell 100 is operated, a fuel gas such as hydrogen gas is supplied to the fuel electrode 22 via the fuel electrode gas passages 38 and an oxidizing gas such as air is supplied to the air electrode 24 via the air electrode gas passages 40. Each of the fuel electrode gas passages 38 is opposite to an area of the separator 36 where the air electrode gas passages 40 are not formed. Each of the air electrode gas passages 40 is opposite to an area of the separator 34 where the fuel electrode gas passages 38 are not formed.

According to this arrangement, electricity generation reaction occurs in the cell 50. When the hydrogen gas is supplied to the catalytic layer 26 via the gas diffusion layer 28, hydrogen in the gas turns into protons. These protons travel to the air electrode 24 in the solid polymer electrolyte membrane 20. Electrons discharged in this process move to an external circuit and flow into the air electrode 24 from the external circuit. When air is supplied to the catalytic layer 30 via the gas diffusion layer 32, oxygen is bonded with the protons, producing water. As a result, electrons flow in the external circuit from the fuel electrode 22 to the air electrode 24, producing electric power for extraction. Passages for cooling water are provided on the other surface of the separator 34.

Figure 2:
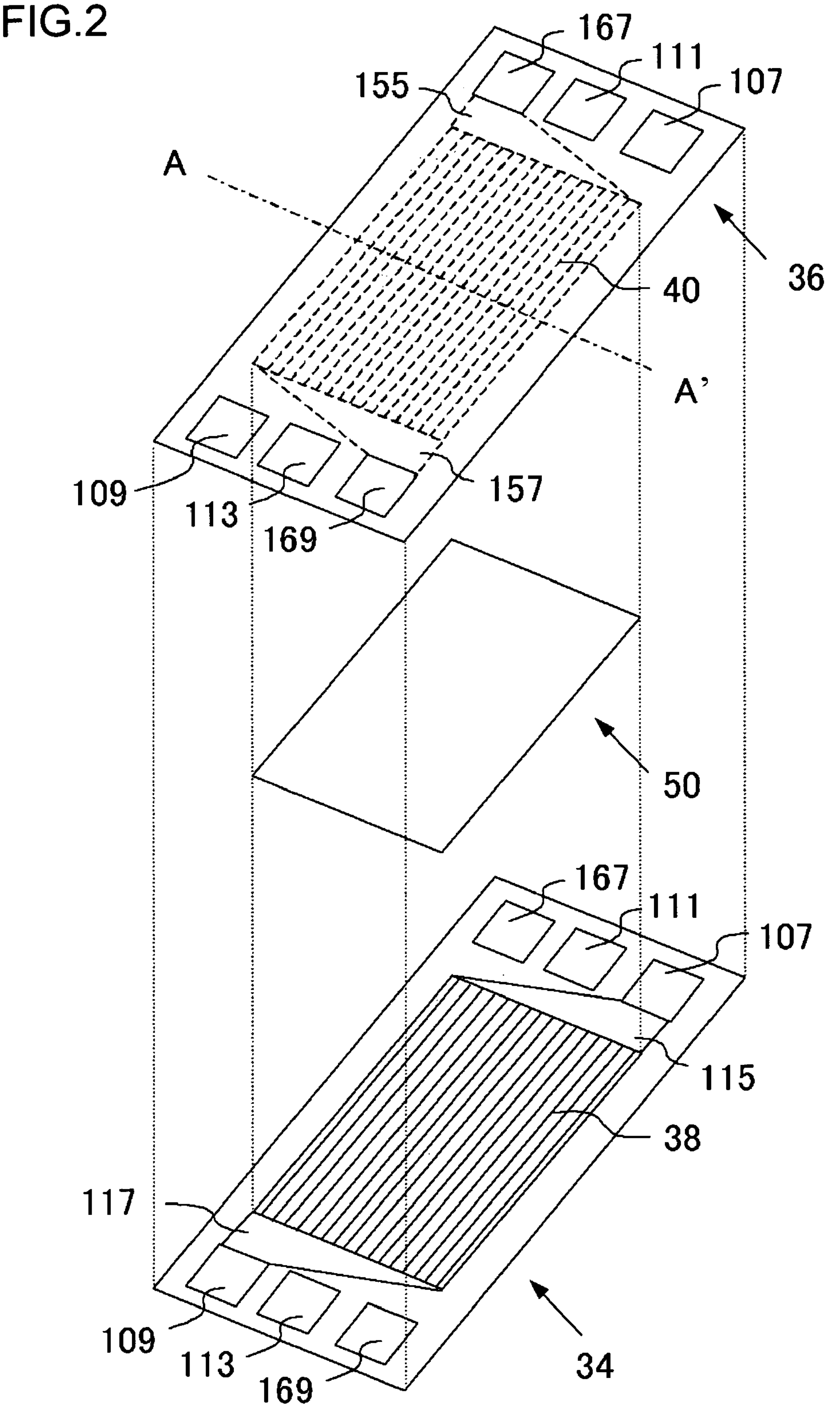
FIG. 2 is an exploded perspective view schematically showing a structure of a separator and a cell constituting the fuel cell according to the embodiment.

FIG. 2 is an exploded perspective view of the separator 34, the cell 50 and the separator 36 constituting the fuel cell 100. FIG. 1 corresponds to a A–A' section of FIG. 2.

Referring to FIG. 2, the surface of the separator 36 is flat. A plurality of air electrode gas passages 40 parallel with each other are formed on the back of the separator 36, as indicated by dotted lines in the figure. The air electrode gas passages 40 communicate with a second manifold for air supply 155 and a second manifold for air emission 157. The second manifold for air supply 155 communicates with a first manifold for air supply 167, and the second manifold for air emission 157 communicates with a first manifold for air emission 169. Air supplied to the first manifold for air supply 167 from outside travels in the air electrode gas passages 40 via the second manifold for air supply 155, and is emitted outside from the first manifold for air emission 169 via the second manifold for air emission 157.

A plurality of fuel electrode gas passages 38 parallel with each other are formed on the surface of the separator 34. The fuel electrode gas passages 38 communicate with a second manifold for fuel supply 115 and a second manifold for fuel emission 117. The second manifold for fuel supply 115 communicates with a first manifold for fuel supply 107, and the second manifold for fuel emission 117 communicates with a first manifold for fuel emission 109. The fuel supplied to the first manifold for fuel supply 107 from outside travels in the fuel electrode gas passages 38 via the second manifold for fuel supply 115, and is emitted outside from the first manifold for fuel emission 109 via the second manifold fur fuel emission 117. Although not shown in the figure, cooling water passages communicating with a first manifold for cooling water supply 111 and a first manifold for cooling water emission 113 are formed on the back of the separator 34.

As shown in FIG. 2, the configuration of the separator 34 and the separator 36 may be rectangular. The plurality of fuel electrode gas passages 38 and the air electrode gas passages 40 may be formed parallel with each other in a rectangular area of the separator 34 and the separator 36, respectively.

The ratio between a shorter edge and a longer edge of a rectangle in which the fuel electrode gas passages 38 or the air electrode gas passages 40 are formed may be 1:2–1:6. The reason is as follows. In order to ensure that the fuel gas supplied to a separator efficiently contributes to a reaction, it is desirable that the number of passages be small and the flow rate of fuel gas flowing in the passages be high. Since the fuel gas or air is normally supplied to the separator after being moistened, it is desirable that the flow rate be high enough to produce effects of blowing off and discharging condensed water that remains in the passages. As a result of a study by the inventors from these perspectives, it was found that a fuel cell with a high electricity generating efficiency is produced by ensuring that the rectangle has the above-mentioned ratio.

The fuel electrode gas passages 38 of the separator 34 are opposite to the flat surface of the separator 36 via the cell 50. Similarly, the air electrode gas passages 40 of the separator 36 are opposite to the flat surface of the separator 34 via the cell 50. In this way, the separator 34 and the separator 36 are constructed such that the fuel electrode gas passages 38 and the air electrode gas passages 40 are not opposite to each other. With this construction, variation in the area of cross section of the fuel electrode gas passages 38 and the air electrode gas passages 40 due to the intrusion of the cell 50 into the passage is properly prevented. Therefore, passage to passage variation in the quantity of hydrogen gas or air supplied is prevented. Accordingly, hydrogen gas or air is supplied to the entirety of the cell 50 in a stable manner. It is thus ensured that the fuel cell is operated in a stable manner.

Figure 8:
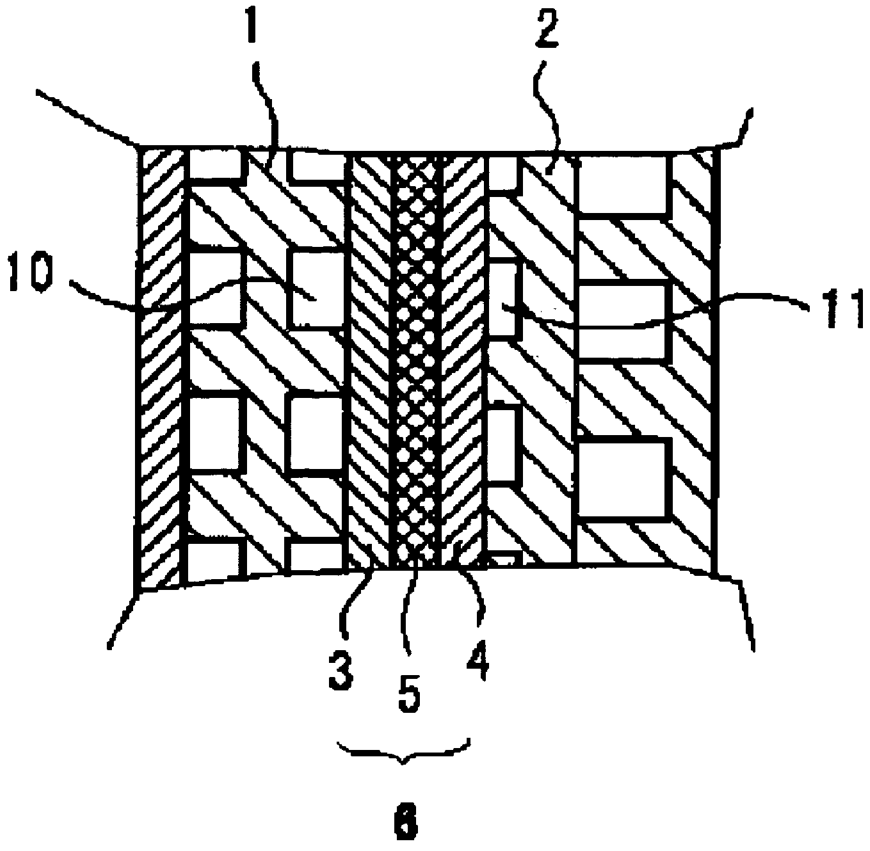
FIG. 8 is a schematic section showing a structure of a related-art fuel cell.

The related art fuel cell employs a structure in which the gas passages 10 and the gas passages 11 provided on the respective sides of the cell 6 are merely opposite to each other, as shown in FIG. 8. The related-art fuel cell is not based on an idea of ensuring that the gas passages 10 and the gas passages 11 are not opposite to each other.

In contrast, this embodiment is based on an idea of ensuring that the fuel electrode gas passages are not opposite to the air electrode gas passages. By ensuring that the passages formed in one of the separator 34 and the separator 36 are opposite to the surface of the other separator which is in contact with the electrode, a structure results in which the passages are not opposite to each other, and the passage are opposite to the flat surface. With this, it is ensured that the degree of intrusion of the cell 50 into the fuel electrode gas passages 38 or the air electrode gas passages 40 is uniform so that pressure drop is uniform from passage to passage. Therefore, the distribution of reactant gas is uniform from passage to passage. Accordingly, it is ensured that the fuel cell provides a stable output.

FIGS. 3 through 6 show examples of structure involving a combination of the separator 34 and the separator 36. These figures are cross sections perpendicular to the extension of the passages. FIGS. 3 through 6 show arrangements of the fuel electrode gas passages 38 and the air electrode gas passages 40, the cell 50 between the separator 34 and the separator 36 being omitted from the illustration.

Referring to FIGS. 3 through 6, symbol A indicates a width of the area in the separator 36 in which the passages are formed. Symbol B indicates a width of the area in the separator 34 in which the passages are formed. Symbol C indicates a width of each of the air electrode gas passages 40. Symbol D indicates an interval between adjacent ones of the air electrode gas passages 40. Symbol E indicates a width of each of the fuel electrode gas passages 38. Symbol F indicates an interval between adjacent ones of the fuel electrode gas passages 38. Symbol G indicates a depth of each of the air electrode gas passages 40. Symbol H indicates a depth of each of the fuel electrode gas passages 38.

The values of A and B may be selected as required in accordance with the size of the cell 50 and the number of passages. For example, given that the cell area of reaction is 100 cm2, the width A and the width B may be in the range of 40 mm–70 mm. With this, it is ensured that the ratio between a shorter edge and a longer edge of a rectangle in which the fuel electrode gas passages 38 or the air electrode gas passages 40 are formed is 1:2–1:6.The width C of the air electrode gas passages 40 and the width E of the fuel electrode gas passages 38 may be set appropriately in accordance with the size of the cell 50 or the flow rate of gas. For example, the width may be in the range of 0.3 mm–1 mm.

The interval D of the air electrode gas passages 40 and the interval F of the fuel electrode gas passages 38 are set such that each of the fuel electrode gas passages 38 and the air electrode gas passages 40 is opposite to the contact surface of the opposite separator.

The ratio between (width C of the air electrode gas passages 40+interval D of the air electrode gas passages 40) and (width E of the fuel electrode gas passages 38+interval F of the fuel electrode gas passages 38) may be in the range of 1:1–1:5. Alternatively, the ratio may be in the range of 1:2–2:3. By ensuring that the ratio is in such ranges, the fuel gas and air can be supplied to the entirety of the cell 50 in a stable manner.

Figure 4:
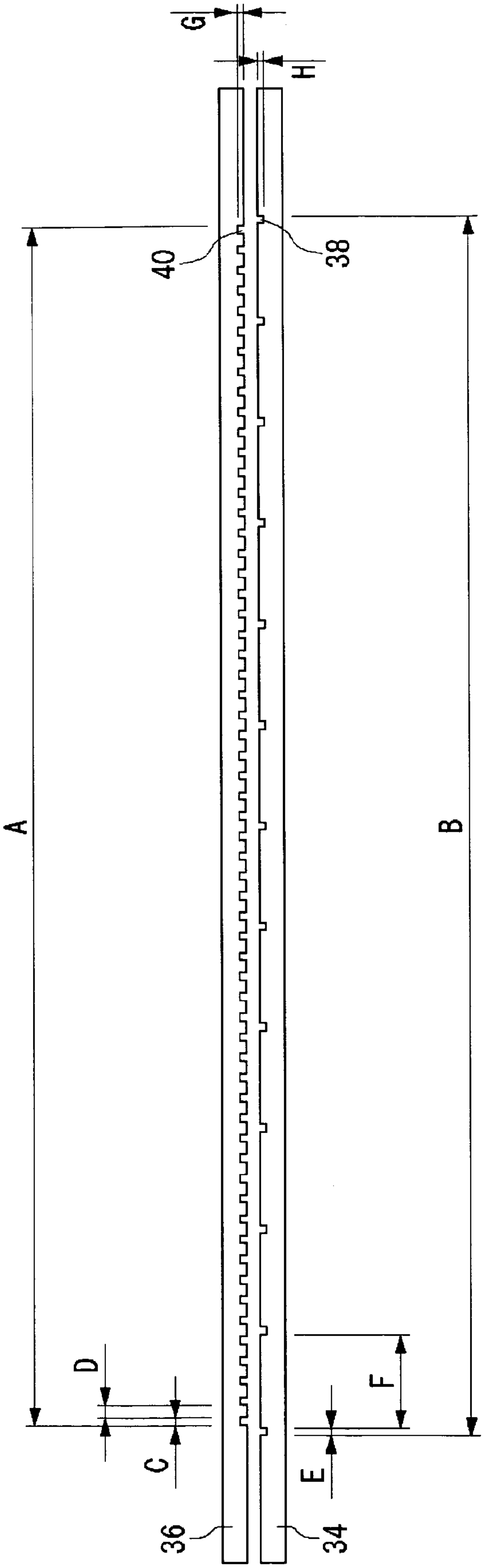
FIG. 4 is a section showing a structure of another fuel cell separator according to the embodiment.

The depth H of the fuel electrode passages 38 may be equal to or greater than the width E of the fuel electrode gas passages 38. For example, the depth H of the fuel electrode gas passages 38 in FIG. 4 is equal to the width E of the fuel electrode gas passages 38. With this, variation in the area of cross section of the fuel electrode gas passages 38 due to the intrusion of the cell 50 into the depth of the fuel electrode gas passages 38 is prevented. Consequently, passage to passage variation in the quantity of fuel gas supplied in the fuel electrode gas passages 38 is properly prevented. Similarly, the depth G of the air electrode gas passages 40 may be greater than the width C of the air electrode gas passages 40.

The depth H of the fuel electrode gas passages 38 may be 200% of or smaller than the width E of the fuel electrode gas passages 38. With this, the thickness of the separator 34 is prevented from increasing excessively. In this way, the size and weight of the fuel cell stack are reduced. Further, the depth G of the air electrode gas passages 40 may be 200% of or smaller than the width C of the air electrode gas passages 40.

When the depth H of the fuel electrode gas passages 38 is smaller than the width E of the fuel electrode gas passages 38, it is preferable that the width E of the fuel electrode gas passages 38 be 200% of or smaller than the depth H of the fuel electrode gas passages 38. With this, the length surrounding the passage and contacting with water drops, in the cross sectional view of the fuel electrode gas passages 38, is limited accordingly. This will reduce a pressure required to cause drops of condensed water generated in the fuel electrode gas passages 38 to begin to move. Accordingly, the supply of reactant gas is prevented from being blocked due to the condensed water remaining in the fuel electrode gas passages 38 so that the fuel gas can be supplied to the entirety of the cell 50 in a stable manner. It is also preferable that the width C of the air electrode gas passages 40 be 200% of or smaller than the depth G of the air electrode gas passages 40.

The separator 34 and the separator 36 may be 2 mm or smaller in thickness. With this, the overall size and weight of a fuel cell stack formed by building a stack of the cell 50, the fuel electrode gas passages 38 and the air electrode gas passages 40 are reduced. The separator 34 and the separator 36 may be 1 mm or greater in thickness. With this, sufficient strength of the separators is secured.

In the separator 34 and the separator 36 shown in FIGS. 3 through 6, the cross-sectional configuration of the fuel electrode gas passages 38 and that of the air electrode gas passages 40 are substantially identical. By ensuring that a plurality of cross-sectional configurations in a separator are substantially identical, variation in the quantity of gas supplied is prevented so that the gas can be supplied to the entirety of the cell 50 in a uniform manner. Consequently, the fuel cell can be operated in a stable manner.

Figure 3:
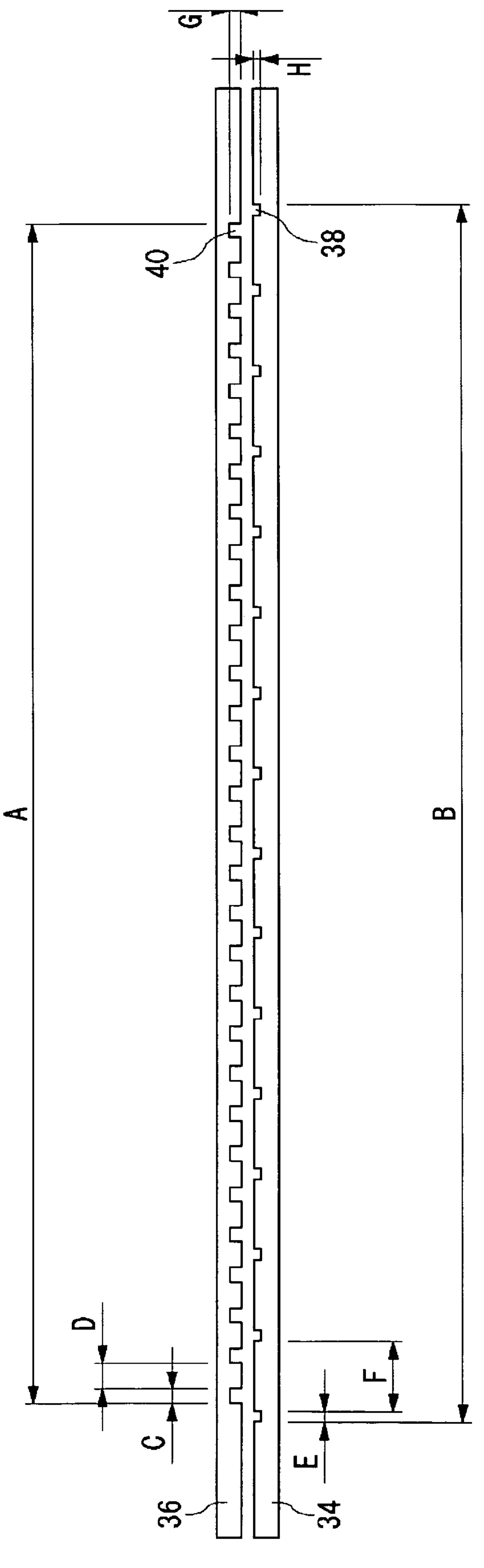
FIG. 3 is a section showing a structure of a fuel cell separator according to the embodiment.

In a combination of the separator 34 and the separator 36 shown in FIG. 3, the ratio between (width C of the air electrode gas passages 40+interval D of the air electrode gas passages 40) and (width E of the fuel electrode gas passages 38+interval F of the fuel electrode gas passages 38) is 1:2. The ratio between the width C of the air electrode gas passages 40 and the depth G of the air electrode gas passages 40 is 6:5. The ratio between the width E of the fuel electrode gas passages 38 and the depth H of the fuel electrode gas passages 38 is 5:3. The ratio between the width C of the air electrode gas passages 40 and the interval D of the air electrode gas passages 40 is 6:11, and the ratio between the width E of the fuel electrode gas passages 38 and the interval F of the fuel electrode gas passages 38 is 5:29.

In a combination of the separator 34 and the separator 36 shown in FIG. 4, the ratio between (width C of the air electrode gas passages 40+interval D of the air electrode gas passages 40) and (width E of the fuel electrode gas passages 38+interval F of the fuel electrode gas passages 38) is 1:5. The ratio between the width C of the air electrode gas passages 40 and the depth G of the air electrode gas passages 40 is 1:1. The ratio between the width E of the fuel electrode gas passages 38 and the depth H of the fuel electrode gas passages 38 is 1:1. The ratio between the width C of the air electrode gas passages 40 and the interval Dof the air electrode gas passages 40 is 3:5, and the ratio between the width E of the fuel electrode gas passages 38 and the interval F of the fuel electrode gas passages 38 is 3:37.

Figure 5:
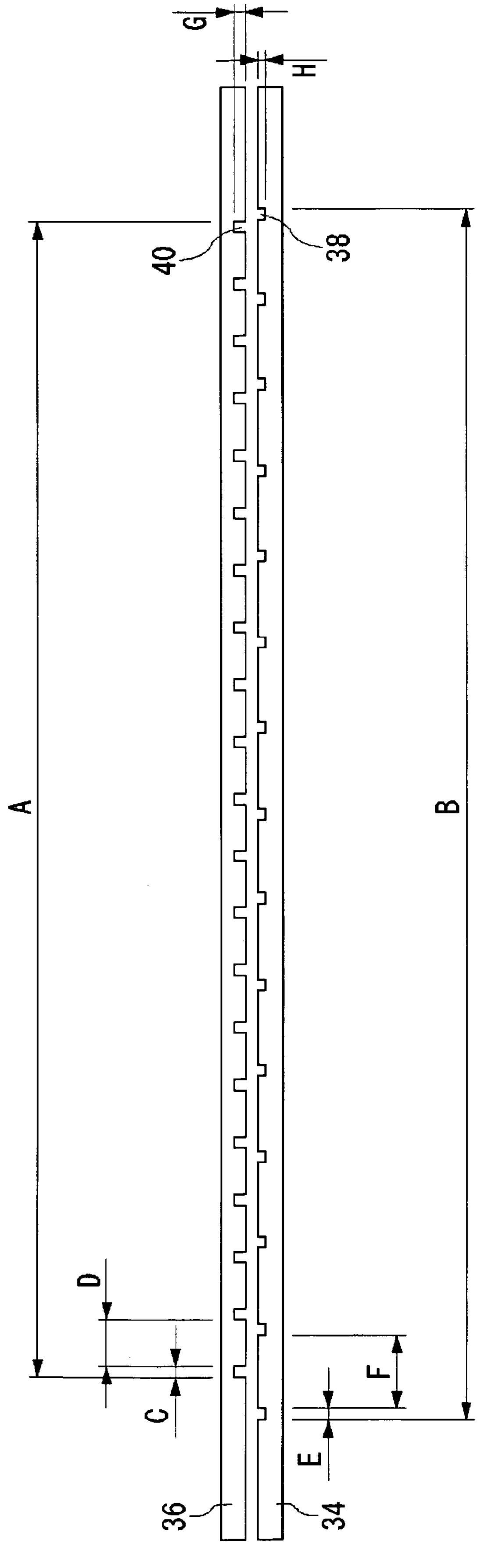
FIG. 5 is a section showing a structure of another fuel cell separator according to the embodiment.

In a combination of the separator 34 and the separator 36 shown in FIG. 5, the ratio between (width C of the air electrode gas passages 40+interval D of the air electrode gas passages 40) and (width E of the fuel electrode gas passages 38+interval Fof the fuel electrode gas passages 38) is 2:3. The ratio between the width C of the air electrode gas passages 40 and the depth G of the air electrode gas passages 40 is 1:1. The ratio between the width E of the fuel electrode gas passages 38 and the depth H of the fuel electrode gas passages 38 is 5:3. The ratio between the width C of the air electrode gas passages 40 and the interval D of the air electrode gas passages 40 is 5:19, and the ratio between the width E of the fuel electrode gas passages 38 and the interval F of the fuel electrode gas passages 38 is 5:31.

Figure 6:
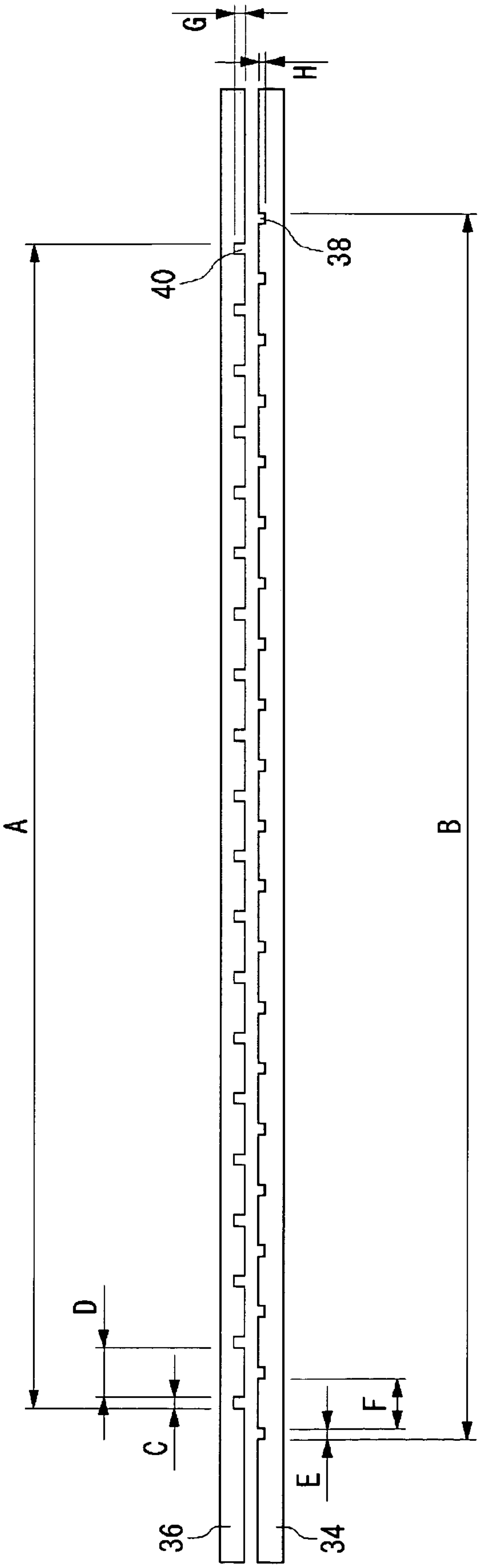
FIG. 6 is a section showing a structure of another fuel cell separator according to the embodiment.

In a combination of the separator 34 and the separator 36 shown in FIG. 6, the ratio between (width C of the air electrode gas passages 40+interval D of the air electrode gas passages 40) and (width E of the fuel electrode gas passages 38+interval F of the fuel electrode gas passages 38) is 1:1. Since the fuel electrode gas passages 38 and the air electrode gas passages 40 are formed at an equal pitch, diffusion polarization occurs evenly in the fuel electrode 22 and the air electrode 24. The ratio between the width C of the air electrode gas passages 40 and the depth G of the air electrode gas passages 40 is 1:1. The ratio between the width E of the fuel electrode gas passages 38 and the depth H of the fuel electrode gas passages 38 is 5:3. The ratio between the width C of the air electrode gas passages 40 and the interval D of the air electrode gas passages 40 is 5:20, and the ratio between the width E of the fuel electrode gas passages 38 and the interval F of the fuel electrode gas passages 38 is 5:20.

Thus, the plurality of fuel electrode gas passages 38 of FIGS. 3 through 6 are formed at equal intervals. The air electrode gas passages 40 are also formed at equal intervals.

With this, it is easy to produce a structure in which the fuel electrode gas passages 38 and the air electrode gas passages 40 are not directly opposite to each other. Accordingly, variation in the area of cross section of the passages is properly prevented.

In FIGS. 3 through 5, the interval between the fuel electrode gas passages 38 and the interval between air electrode gas passages 40 are different from each other. In this arrangement, it is possible to properly control the quantity of fuel gas and air supplied. When the interval between the fuel electrode gas passages 38 and the interval between air electrode gas passages 40 are different from each other in a related-art fuel cell, some of the fuel electrode gas passages 38 are opposite to corresponding ones of the air electrode gas passages 40 via the cell 50, others are not opposite to any of the air electrode gas passages 40, and still others are opposite to respective portions of corresponding ones of the air electrode gas passages 40. In contrast, since it is ensured in the fuel cells of FIGS. 3 through 5 that the fuel electrode gas passages 38 are not opposite to the air electrode gas passages 40, variation in the area of cross section of the passages is properly prevented. The air electrode gas passages 40 are constructed so as not to be opposite to the fuel electrode gas passages 38.

Figure 7A:
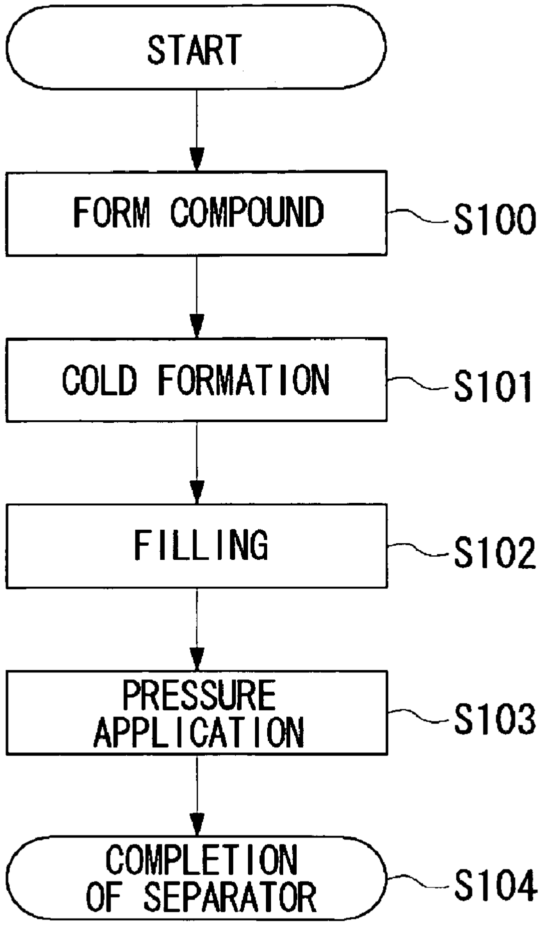
FIGS. 7A and 7B show a method of fabricating the fuel cell separator according to the embodiment.
Figure 7B:
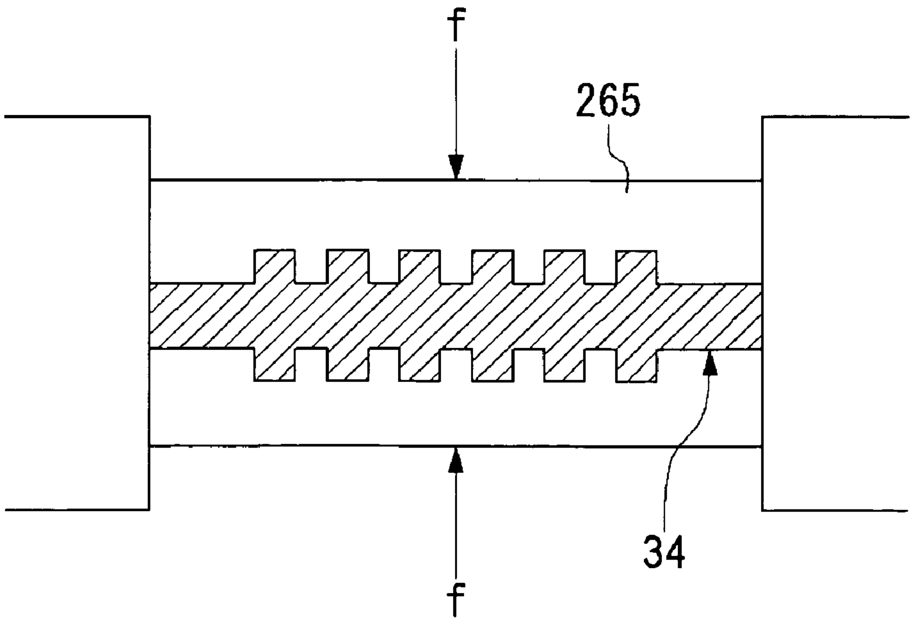

A description will now be given of a method of fabricating the separator 34 and the separator 36. The method for fabricating the separator 34 is described as a representative example. The separator 36 is fabricated in a similar manner. FIGS. 7A and 7B show a method of fabricating fuel cell separator.

The separator 34 and the separator 36 can be formed of a mixture of carbon particles and thermosetting resin particles. Since the resin particles serve as a binding agent, formation is easy. Accordingly, inexpensive plates are obtained. The carbon particles and the thermosetting resin particles may be mixed at a weight ratio in the range of 1:1–19:1.

FIG. 7A is a flowchart showing a process of fabricating the separator 34. FIG. 7B illustrates the fabrication. As shown in FIG. 7A, graphite particles and thermosetting resin particles are mixed uniformly under percentage component control so as to form a compound (S100). A contact pressure in the range of 2 MPa–10 MPa is applied to the compound so that a preliminary configuration which is an approximation of a final configuration is cold formed (S101). Subsequently, the preliminarily formed piece is made to fill a metal mold 265 having the final configuration, as shown in FIG. 7B (S102). In this state, the metal mold 265 is heated at a temperature in the range of 150° C.–170° C. Concurrently with this, a press (not shown) is operated. At this point of time, a contact pressure in the range of 10 MPa–100 MPa, and preferably in the range of 20 MPa–50 MPa, is applied as indicated by the arrow f (S103). In this way, the separator 34 having the final configuration commensurate with the configuration of the metal mold 265 is fabricated (S104).

By fabricating the separator 34 such that a compound having a configuration which is an approximation of the final configuration is preliminarily formed, making the preliminarily formed piece to fill the metal mold 265, applying a contact pressure as high as 10–100 MPa (preferably, 20–50 MPa) to the piece while the piece is being heated at a temperature of 150–170° C., the thermosetting resin is dissolved and a thermosetting reaction occurs. As a result, the separator 34 of a predetermined configuration having a high molded piece density is uniformly formed.

A fuel supply inlet (not shown) or an fuel emission outlet (not shown) for supply and discharge of fuel may be formed in the separator 34 thus obtained. A sealing member (not shown) may be formed around the area in which the passages are formed. With this, adhesion between the separators in a fuel cell stack is secured. Accordingly, leakage of fuel gas is prevented, and the fuel gas is properly supplied from the fuel electrode gas passages 38 to the cell 50.

Referring back to FIG. 1, the solid polymer electrolyte membrane 20 constituting the cell 50 preferably displays good ionic conductivity in a humid condition and functions as an ion exchange membrane causing protons to move between the fuel electrode 22 and the air electrode 24. The solid polymer electrolyte membrane 20 is formed of a solid polymer material such as fluorinated polymer or non-fluorinated polymer. For example, perfluorocarbon polymer of a sulfonic acid type, polysulphone resin, or perfluorocarbon polymer having a phosphonic acid group or carboxylic acid group may be used. Nafion (TM) 112 from DuPont is an example of perfluorocarbon polymer of a sulfonic acid type. Aromatic sulfonated polyetheretherketone and polysulfone are examples of non-fluorinated polymer.

The catalytic layer 26 in the fuel electrode 22 and the catalytic layer 30 in the air electrode 24 are porous membranes and are preferably formed of an ion exchange resin and carbon particles carrying a catalyst. The catalyst carried may be a mixture comprising one or two of platinum, ruthenium and rhodium. The catalytic layer 26 and the catalytic layer 30 may be formed of the same substance or different substances. The carbon particles carrying the catalyst may be acetylene black, Ketjen Black, etc.

The ion exchange resin connects the carbon particles carrying the catalyst and the solid polymer electrolyte membrane 20 so as to conduct protons between the particles and the membrane. The ion exchange resin may be formed of a polymer material similar to the one that forms the solid polymer electrolyte membrane 20.

The gas diffusion layer 28 in the fuel electrode 22 and the gas diffusion layer 32 in the air electrode 24 have the function of supplying hydrogen gas and air to the catalyst layer 26 and the catalyst layer 30, respectively. The diffusion layers also have the function of transporting electric charges generated by the power generation reaction to an external circuit and discharging water and non-reacting gas outside. The gas diffusion layer 28 and the gas diffusion layer 32 are preferably formed of a porous material having electron conductivity. For example, the layers may be formed of carbon paper or carbon cloth.

An example of a method for fabricating the cell 50 will be shown. First, a catalyst metal such as platinum is carried by carbon particles for carrying a catalyst, using a impregnation method or a colloid method, in order to fabricate the fuel electrode 22 and the air electrode 24. A complex formed of carbon particles for carrying a catalyst and a catalyst metal will be referred to as catalyst-carrying particles.

The catalyst-carrying particles and the ion exchange resin are dissolved in a solvent so as to produce a catalyst ink. A material, such as carbon paper, for forming a gas diffusion layer is coated with the catalyst ink thus produced, and then heated and dried. The fuel electrode 22 and the air electrode 24 are thus produced. Coating may be done by brush application, spray application, screen printing, doctor blade coating or decalcomania transferring.

Subsequently, the solid polymer electrolyte membrane 20 is sandwiched by the catalyst layer 26 of the fuel electrode 22 and the catalyst layer 30 of the air electrode 24. The cell 50 is thus produced. When the solid polymer electrolyte membrane 20 and the ion exchange resin of the catalyst layer 26 and the catalyst layer 30 are formed of a polymer material having a softening point or yielding to glass transition, it is preferable that hot press be conducted at a temperature beyond a softening temperature or a glass transition temperature.

Alternative methods of fabricating the cell 50 are as follows. The catalyst layer 26 and the catalyst layer 30 may be formed by directly coating the solid polymer electrolyte membrane 20 with a catalyst ink and by heating and drying the membrane. For example, coating may be done by spray coating. The cell 50 may be produced by providing the gas diffusion layer 28 and the gas diffusion layer 32 outside the catalyst layer 26 and the catalyst layer 30, respectively, and then subjecting the assembly to hot press. The catalytic layer 26 and the catalytic layer 30 of the cell 50 may be fabricated such that a Teflon (TM) sheet is coated with a catalyst ink, and then heated and dried. For example, coating may be done by spray coating or screen printing. Subsequently, the catalyst layer 26 and the catalyst layer 30, formed on the respective Teflon sheets, are provided opposite to each other across the solid polymer electrolyte membrane 20, and are then subject to hot press for assembly. The Teflon sheets are then removed so that the gas diffusion layer 28 and the gas diffusion layer 32 are provided outside the catalytic layer 26 and the catalytic layer 30, respectively.

Described above is an explanation based on the embodiment. The description of the embodiment is illustrative in purpose and it will be obvious to those skilled in the art that various variations are possible within the scope of the present invention.

While the gas diffusion layer 28 of the fuel electrode 22 and the gas diffusion layer 32 of the air electrode 24 are described as being in contact with the separator 34 and the separator 36, respectively, an additional layer may be provided between the gas diffusion layer 28 and the separator 34 and between the gas diffusion layer 32 and the separator 36.

In the fuel cell according to the above description, a fuel gas is supplied to a fuel electrode. Alternatively, the structure according to the embodiment is applicable to a fuel cell of a type in which a liquid fuel such as methanol is directly introduced (DMFC).

What is claimed is:

1. A fuel cell comprising:

a membrane electrode assembly including an electrolyte and a pair of electrodes provided on respective sides of the electrolyte; and a first separator and a second separator sandwiching said membrane electrode assembly, wherein said first separator is provided with a first passage comprising a plurality of recesses formed on a first separator surface in contact with said membrane electrode assembly, said second separator is provided with a second passage comprising a plurality of recesses formed on a second separator surface in contact with said membrane electrode assembly, the recesses of said first separator are opposite, across said membrane electrode assembly, to the second separator surface in contact with said membrane electrode assembly, the recesses of said second separator are opposite, across said membrane electrode assembly, to the first separator surface in contact with said membrane electrode assembly, and a sum of the width of the recess constituting the first passage and an interval between the recesses constituting the first passage is different from a sum of the width of the recess constituting the second passage and an interval between the recesses constituting the second passage.

2. The fuel cell according to claim 1, wherein the plurality of recesses constituting the first passage and the plurality of recesses constituting the second passage extend in one direction and parallel with each other.

3. The fuel cell according to claim 2, wherein the plurality of recesses constituting the first passage and the plurality of recesses constituting the second passage have substantially the same cross-sectional configuration and are formed at regular intervals.

4. The fuel cell according to claim 3, wherein the depth of the recesses constituting the first passage is greater than the width of the recesses constituting the first passage.

* * * * *